United States Patent [19]
Gleason et al.

[11] 3,860,631
[45] Jan. 14, 1975

[54] PROCESS FOR THE PREPARATION OF N-ACTYL-2- AND 4-HYDROXYPHENYL-GLYCINES

[75] Inventors: John G. Gleason, Cornwall Heights, Pa.; Kenneth G. Holden, Haddonfield, N.J.; Nelson C. F. Yim, Philadelphia, Pa.

[73] Assignee: SmithKline Corporation, Philadelphia, Pa.

[22] Filed: Dec. 6, 1973

[21] Appl. No.: 422,398

[52] U.S. Cl...... 260/471 C, 260/455 A, 260/471 A, 260/519
[51] Int. Cl........................................... C07c 125/06
[58] Field of Search........ 260/455 A, 471 A, 471 C, 260/519

[56] References Cited
OTHER PUBLICATIONS

Royals, E. E., Advanced Organic Chemistry, (1961), pub. by Prentice Hall, Inc. (QD251R68c.6), page 475.

*Primary Examiner*—Lorraine A. Weinberger
*Assistant Examiner*—L. A. Thaxton
*Attorney, Agent, or Firm*—Alan D. Lourie; William H. Edgerton

[57] ABSTRACT

A new process is disclosed for the preparation of N-actyl-2- and 4-hydroxyphenylglycines which comprises reacting an optionally substitued phenol with (1) glyoxylic acid or an ester and (2) an amide, carbamate, thiocarbamate or urea.

8 Claims, No Drawings

PROCESS FOR THE PREPARATION OF N-ACYL-2- AND 4-HYDROXYPHENYLGLYCINES

This invention relates to an improved method for preparing N-acyl-2- and 4-hydroxyphenylglycines which are useful in the production of antibacterial agents. In particular, 2- and 4-hydroxyphenylglycines (I) are prepared which have a suitably protected, for example acylated, amino function so that the glycine may be directly coupled to penicillin and cephalosporin nuclei to produce a product having antibacterial properties.

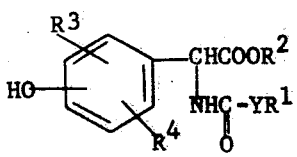

In the above formula I, the groups $R^1$, $R^2$, $R^3$, $R^4$ and Y are defined as follows:

$R^1Y$ can be any group which with the adjacent carbonyl group forms an amine protective group removable under conditions which are mild enough not to affect the remainder of the molecule. $R^1$ can therefore be hydrogen, except when Y is O or S; lower alkyl of one to five carbon atoms, including methyl, ethyl, propyl, butyl, isobutyl and t-butyl; haloalkyl of one to five carbon atoms such as trichloroethyl or, when Y is a single bond, trifluoromethyl; aralkyl such as substituted or unsubstituted benzyl or α-phenethyl; and aryl such as substituted or unsubstituted phenyl. Y can be O, NH, S or a carbon-carbon single bond. The substituents on benzyl and phenyl can be halo, lower alkyl, lower alkoxy or nitro. Preferred groups are those where $R^1Y$ is t-butoxy, trichloroethoxy, trifluoromethyl or benzyloxy.

$R^2$ can be hydrogen or any carboxyl protective group which is easily removable or is itself usable in the acylation reaction in which the product glycine compound is used. $R^2$ can therefore be hydrogen, lower alkyl of one to five carbon atoms, including methyl, ethyl and n-butyl; haloalkyl such as trichloroethyl; menthyl; 2-octyl; benzyl or benzhydryl.

$R^3$ and $R^4$ are each hydrogen; lower alkyl or lower alkoxy, each such lower alkyl or alkoxy group having from one to five carbon atoms; hydroxy; halo; acylated amino or nitro. Preferred groups are hydrogen, methyl, methoxy, hydroxy or fluoro.

N-Acyl-2- and 4-hydroxyphenylglycines are useful as intermediates for preparing substituted phenylglycylacetamido cephalosporins and penicillins, which are well known as anti-bacterial agents. Representative examples of such anti-bacterial compounds are described in U.S. Pat. Nos. 3,489,750, 3,489,752, 3,507,861 and 3,634,418. The penicillins and cephalosporins are prepared by acylation of the penicillin or cephalosporin nucleus with the N-acyl-2- or 4-hydroxyphenylglycine. Prior to the acylation reaction, the amino group of the glycine moiety is usually protected with any of a variety of well known and easily removable amine protective groups such as t-butoxycarbonyl, benzyoxycarbonyl, trichloroethoxycarbonyl or similar protective groups commonly used in a synthesis of peptides. Thus, one normally must prepare the glycine compound and then protect the amino group prior to carrying out the acylation reaction. An important advantage of the process of this invention is that protection of the amino function of the glycine moiety is a direct result of the method of synthesis and does not require a separate acylation step. Another advantage arising from the process of this invention is that, in order to protect the amino group of the glycine moiety with the easily removable t-butyl group by prior art processes, it is necessary to use the expensive t-butyl carbonyl azide, whereas, by the present process, this group is introduced with the much less costly t-butyl carbamate. Furthermore, the acyl group can be selected so that it is easily removed from the final product in high yield under mild conditions. The glycine is also produced in a form which is amenable to ready resolution into optical isomers by standard methods.

The process of this invention comprises reacting an optionally substituted phenol with glyoxylic acid or an ester thereof and an amide, carbamate, thiocarbamate or urea, according to the following scheme:

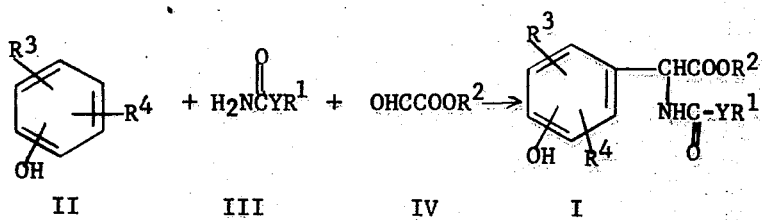

wherein $R^1$, $R^2$, $R^3$, $R^4$ and Y are defined as above.

This process provides a simple and facile method for preparing 2- and 4-hydroxyphenylglycines N-acylated with a variety of protective groups. The preparation of α-amino hydroxyphenylglycines from an optionally substituted phenol, glyoxylic acid or its salts and an amine of the formula NHR, where R is hydrogen or lower alkyl, has been described in Belgian Pat. Nos. 774,029 and 769,708. U.S. Pat. No. 2,824,128 discloses the preparation of bis-glycine derivatives from a phenol, sodium glyoxylate and ethylenediamine. As described in Belgian Pat. No. 774,029, N-acylation is accomplished by treatment of the preformed α-amino hydroxyphenylglycine with an acylating agent such as acetyl chloride. The present process eliminates this last step.

Inasmuch as the amine-bearing reagent

of the process of this invention is an amide, the amino group of which is distinctly less basic than that of the amines described in the prior art Belgian patent, it was not expected that the present process would be operable. A number of intermediates and stable products can result from the reaction of glyoxylic acid or its esters with an amido-containing species (III) and it was unexpected, in light of the prior art, to have formed among these possibilities an intermediate, believed to be an acylimine, which is able to undergo addition to the desired phenolic moiety in high yield. The present process is also different from the process of Belgian Pat. No. 774,029 in being acid-catalyzed and carried out in an organic solvent or without solvent rather than base-catalyzed and run in aqueous medium. Finally, the resulting product of the present process is an N-acylated amino acid rather than a free amino acid, and is thus ready for coupling to a penicillin or cephalosporin nucleus without further manipulations.

In the process of this invention as outlined above, a mixture of one molar equivalent of gyloxylic acid or an ester, for example n-butyl glyoxylate (Org. Syn., Col. Vol. 4, 124); an excess, about two molar equivalents being preferable, of an optionally substituted phenol; and approximately one molar equivalent of:
 a. a carbamate such as t-butyl carbamate [Org. Syn. 48, 32 (1968); U.S. Pat. No. 3,072,710],
 b. a thiocarbamate,
 c. an amide such as acetamide, or
 d. a urea such as phenylurea is warmed to form a clear, homogeneous solution which is then maintained at ambient temperature, i.e. about 25°, for from about 12 hours to about 5 days. An excess amount of the phenol is necessary to suppress formation of undesirable by-products. When high melting phenols are employed in the reaction, an inert organic co-solvent such as ethyl acetate, ether, dioxane, xylene, chloroform, methylene chloride, carbon tetrachloride, benzene, toluene, tetrahydrofuran or the like may be added. A Lewis acid such as boron trifluoride etherate or aluminum chloride may be used to catalyze the reaction, although other acids such as formic acid or trifluoroacetic acid may also be employed. The catalyst is usually added after the initial reaction mixture has been cooled to about 25° or less. When the glyoxylic moiety is used as the free acid, it is not necessary to use an additional acid catalyst, although it may be helpful to do so, particularly if the phenol is relatively unreactive. When no catalyst is added, the reaction time will be longer than when a catalyst is present. In unusual cases where the phenol is sluggish in reacting, heating with or without the presence of solvent may be necessary, but it is preferable to keep the reaction temperature at or below the reflux temperature of the solvent when used.

When the initial condensation is substantially complete, as indicated by thin layer chromatography, the pH of the reaction mixture is adjusted to about 7.0 by addition of an aqueous solution of a base such as sodium hydroxide, trisodium phosphate, sodium carbonate or sodium bicarbonate. At this time, additional amounts of solvent may be added. The neutral mixture is then extracted with a water-immiscible solvent such as ethyl acetate to remove unreacted phenol and the aqueous phase is acidified to about pH 4.0 with a mineral acid such as 85% phosphoric acid, then again extracted several times with a water-immiscible solvent such as ethyl acetate with care being taken to maintain the pH of the aqueous phases very close to 4.0. The product, a mixture of N-acyl-2-hydroxyphenylglycine and N-acyl-4-hydroxyphenylglycine, is isolated from the extracts. (In instances where the $R^3$ or $R^4$ group of the starting phenol (II) is itself placed ortho or para to the acylglycine moiety, the product clearly cannot have a hydroxy group in such position. The present process is therefore limited to use of starting materials having either or both of the positions ortho or para to hydroxy unsubstituted. When both of such positions are unsubstituted, a mixture of 2-hydroxy and 4-hydroxy isomers are produced. When only one such position is unsubstituted, only that corresponding hydroxy compound is produced.) Separation of the isomers, when obtained, is accomplished by standard methods, including crystallization (N-acyl-4-hydroxyphenylglycine, the major product, normally crystallizes more readily) and chromatography. To aid in separation of the isomers, the N-acyl-2-hydroxyphenylglycine can be converted to the corresponding δ-lactone by standard methods, for example, by use of dehydrating agents such as N,N'-dicyclohexylcarbodiimide (DCC), boron trifluoride or acid. The lactone can be reconverted to the N-acyl-2-hydroxyphenylglycine by basic hydrolysis with, for example, aqueous sodium hydroxide or it can be used directly for acylation of the penicillin or cephalosporin nucleus.

Excess phenol may also be removed by vacuum distillation of the reaction mixture prior to addition of aqueous base. When acid sensitive amine protective groups, for example, t-butoxycarbonyl, are used, an equivalent of an inert base such as triethylamine may be added prior to distillation. The phenylglycine salts are then converted to the corresponding free acids by acidification.

Alternatively, a small amount of organic solvent may be added to the reaction mixture and the product directly collected by filtration, particularly if the mixture has solidified during the course of the reaction. In some cases, the product may also be precipitated from the initial reaction mixture by acidification to about pH 2.0. Purification and separation of the isomers is then accomplished as described above.

It will be recognized that, due to the asymmetric α-carbon atom in the glycine compounds, optical isomers will exist. The resolved N-acyl-2- and 4-hydroxyphenylglycines are readily obtained, when desired, by resolution of the racemic compounds by well-known methods including fractional crystallization of a salt formed with an optically active base. Formation of the desired optical isomer can be enhanced by asymmetric induction. Thus, for example, starting materials of formulas III and IV in which $R^1$ is optically active α-phenethyl and/or $R^2$ is d- or l-menthyl or 2-octyl are used in the reaction sequence. Separation of the product mixture (enriched in one optical antipode) is accomplished in a standard manner as previously described. Both resolved and racemic compounds are usable in the acylation of cephalosporins and penicillins.

The following examples illustrate the process of this invention, but are not to be construed as limiting the scope thereof.

EXAMPLE 1

N-t-Butoxycarbonyl-2-(4-hydroxyphenyl)glycine and N-t-butoxycarbonyl-2-(2-hydroxyphenyl)glycine A mixture of 9.2 g. (0.1 mol.) of glyoxylic acid hydrate, 11.7 g. (0.1 mol.) of t-butyl carbamate [Org. Syn. 48, 32 (1968); U.S. Pat. No. 3,072,710] and 18.8 g. (0.2 mol.) of phenol was warmed gently to form a homogeneous melt. After standing for three days at 25°, the pH of the reaction mixture was adjusted to 7.0 by addition of 5% aqueous trisodium phosphate and the resulting solution was extracted three times with ethyl acetate. The aqueous phase was acidified to pH 4.0 with 85% phosphoric acid, extracted with ethyl acetate and the organic extract was dried ($Na_2SO_4$) and concentrated to yield a residue which was dissolved in methylene chloride. Hexane was added to the methylene chloride solution until the cloud point, then 1.8 ml. of water was added with vigorous stirring to cause crystallization of N-t-butoxycarbonyl-2-(4-hydroxyphenyl)glycine as its hydrate, m.p. 112°–114° dec.

The mother liquors were treated with N,N'-dicyclohexylcarbodiimide (one equivalent of the estimated amount of 2-hydroxy isomer present) in methylene chloride and the reaction mixture was stirred at room temperature for one hour. The mixture was filtered and the filtrate washed with water and cold 5% aqueous sodium bicarbonate, dried (MgSO$_4$) and concentrated to give the Δ-lactone. The lactone was refluxed with 10% aqueous sodium hydroxide in methanol and the reaction mixture was diluted with water and extracted with methylene chloride to remove any 4-hydroxyphenylglycine remaining. Acidification of the aqueous phase with phosphoric acid gave N-t-butoxycarbonyl-2-(2-hydroxyphenyl)glycine, m.p. 125°.

EXAMPLE 2

N-Benzyloxycarbonyl-2-(4-hydroxyphenyl)glycine and N-benzyloxycarbonyl-2-(2-hydroxyphenyl)glycine A mixture of 0.92 g. (0.01 mol.) of glyoxylic acid hydrate, 1.51 g. (0.01 mol.) of benzyl carbamate and 2.82 g. (0.03 mol.) of phenol was warmed to form a homogeneous melt. After addition of 0.2 ml. of boron trifluoride etherate the reaction mixture was allowed to stand at 25° for 12 hours. The solidified mixture was then stirred with 25 ml. of ether and filtered to give N-benzyloxycarbonyl-2-(4-hydroxyphenyl)-glycine, m.p. 186°–188° (ethyl acetate-hexane). N-Benzyloxycarbonyl-2-(2-hydroxyphenyl)glycine is isolated from the mother liquors as the corresponding lactone which is converted to the 2-hydroxy acid according to the procedure described in Example 1.

EXAMPLE 3

N-t-Butoxycarbonyl-2-(4-hydroxy-3-methylphenyl)glycine and N-t-butoxycarbonyl-2-(2-hydroxy-3-methylphenyl)glycine A homogeneous melt of 5.06 g. (0.051 mol.) of glyoxylic acid hydrate, 5.85 g. (0.05 mol.) of t-butyl carbamate and 10.8 g. (0.1 mol.) of o-cresol was prepared by gentle warming. After cooling to 25°, 0.5 ml. of boron trifluoride etherate was added, the reaction mixture was mixed and allowed to stand for 48 hours. Ethyl acetate and enough 5% aqueous sodium carbonate were then added to bring the pH of the reaction mixture to 7.0 and the resulting solution was extracted with two portions of ethyl acetate. The aqueous phase was acidified to pH 4.0 with phosphoric acid, extracted with ethyl acetate and the extract was dried (Na$_2$SO$_4$) and concentrated to give a mixture of N-t-butoxycarbonyl-2-(4-hydroxy-3-methylphenyl)glycine and N-t-butoxycarbonyl-2-(2-hydroxy-3-methylphenyl)glycine which was separated by chromatography on silica gel using benzene containing 2% acetic acid and increasing amounts of ethyl acetate to give the title compounds, m.p. 133°–135° dec. (4-hydroxy isomer); m.p. 127°–129° dec. (2-hydroxy isomer).

EXAMPLE 4

N-t-Butoxycarbonyl-2-(4-hydroxy-2-methylphenyl)glycine and N-t-butoxycarbonyl-2-(2-hydroxy-4-methylphenyl)glycine When an equivalent amount of m-cresol was substituted in the procedure of Example 3 for o-cresol, a mixture of N-t-butoxycarbonyl-2-(4-hydroxy-2-methylphenyl)glycine and N-t-butoxycarbonyl-2-(2-hydroxy-4-methylphenyl)glycine was obtained. The 4-hydroxy isomer (major product) crystallized from methylene chloride containing a small amount of water, m.p. 120°–121° dec.; 100°–115° after drying. Chromatography of the mother liquor as described in Example 3 gave the 2-hydroxy isomer, m.p. 161°–163° dec. (toluene).

EXAMPLE 5

N-t-Butoxycarbonyl-2-(4-hydroxy-3,5-dimethylphenyl)glycine

A homogeneous melt of 5.06 g. (0.051 mol.) of glyoxylic acid hydrate, 5.85 g. (0.05 mol.) of t-butyl carbamate and 12.2 g. (0.1 mol.) of 2,6-xylenol was prepared by gentle warming. The reaction mixture was thoroughly mixed and allowed to stand for 48 hours at 25°. Ethyl acetate and enough 5% aqueous sodium carbonate were then added to bring the pH of the reaction mixture to 7.0 and the resulting solution was extracted with two portions of ethyl acetate. The aqueous phase was acidified to pH 4.0 with phosphoric acid, extracted with ethyl acetate and the extract was dried (Na$_2$SO$_4$) and concentrated to give the title compound, m.p. 149°–150° dec.

EXAMPLE 6

N-t-Butoxycarbonyl-2-(4-hydroxy-3,5-dimethoxyphenyl)glycine

When an equivalent amount of 2,6-dimethoxyphenyl) was substituted in the procedure of Example 5 for 2,6-xylenol, the title compound was obtained, m.p. 139°–140° dec.

EXAMPLE 7

N-t-Butoxycarbonyl-2-(2,4-dihydroxyphenyl)glycine

A solution of 9.2 g. (0.1 mol.) of glyoxylic acid hydrate, 11.7 g. (0.1 mol.) of t-butyl carbamate and 13.0 g. (0.12 mol.) of resorcinol in 75 ml. of ethyl acetate was allowed to stand at 25° for 18 hours. The reaction mixture was then treated with enough 5% aqueous sodium bicarbonate to bring the pH to 7.2 and the layers were separated. The aqueous phase was extracted three more times with ethyl acetate, then acidified to pH 4.0 with phosphoric acid. Extraction of this aqueous solution with ethyl acetate gave, after drying (Na$_2$SO$_4$) and concentration, the title compound as a viscous liquid.

EXAMPLE 8

N-Phenoxycarbonyl-2-(4-hydroxyphenyl)glycine and N-phenoxycarbonyl-2-(2-hydroxyphenyl)glycine Substitution of an equivalent amount of phenyl carbamate in the procedure of Example 2 for benzyl carbamate gives the title compounds.

EXAMPLE 9

When an equivalent amount of acetamide is substituted in the procedure of Example 1 for t-butyl carbamate, N-acetyl-2-(4-hydroxyphenyl)glycine and N-acetyl-2-(2-hydroxyphenyl)glycine are obtained.

Similarly, substitution of an equivalent amount of benzamide in the procedure of Example 1 for t-butyl carbamate gives N-benzoyl-2-(4-hydroxyphenyl)glycine and N-benzoyl-2-(2-hydroxyphenyl)glycine.

In like manner, when an equivalent amount of phenylacetamide is substituted in the procedure of Example 1 for t-butyl carbamate, N-phenylacetyl-2-(4-hydroxyphenyl)glycine and N-phenylacetyl-2-(2-hydroxyphenyl)glycine are formed.

By the same procedure, N-trifluoroacetyl-2-(4-hydroxyphenyl)glycine and N-trifluoroacetyl-2-(2-hydroxyphenyl)glycine are prepared by substitution of 2,2,2-trifluoroacetamide in the procedure of Example 1 for t-butyl carbamate.

EXAMPLE 10

When an equivalent amount of acetamide, benzamide, phenylacetamide or 2,2,2-trifluoroacetamide is substituted in the procedure of Example 3 for t-butyl carbamate, the following compounds are obtained, respectively:

N-acetyl-2-(4-hydroxy-3-methylphenyl)glycine
N-acetyl-2-(2-hydroxy-3-methylphenyl)glycine
N-benzoyl-2-(4-hydroxy-3-methylphenyl)glycine
N-benzoyl-2-(2-hydroxy-3-methylphenyl)glycine
N-phenylacetyl-2-(4-hydroxy-3-methylphenyl)glycine
N-phenylacetyl-2-(2-hydroxy-3-methylphenyl)glycine
N-trifluoroacetyl-2-(4-hydroxy-3-methylphenyl)glycine
N-trifluoroacetyl-2-(2-hydroxy-3-methylphenyl)glycine.

EXAMPLE 11

Substitution of an equivalent amount of acetamide, benzamide, phenylacetamide or 2,2,2-trifluoroacetamide in the procedure of Example 6 for t-butyl carbamate gives the following compounds, respectively.

N-acetyl-2-(4-hydroxy-3,5-dimethoxyphenyl)glycine
N-benzoyl-2-(4-hydroxy-3,5-dimethoxyphenyl)glycine
N-phenylacetyl-2-(4-hydroxy-3,5-dimethoxyphenyl)glycine
N-trifluoroacetyl-2-(4-hydroxy-3,5-dimethoxyphenyl)glycine.

EXAMPLE 12

When an equivalent amount of acetamide, benzamide, phenylacetamide or 2,2,2-trifluoroacetamide is substituted in the procedure of Example 7 for t-butyl carbamate, the corresponding compounds listed below are obtained:

N-acetyl-2-(2,4-dihydroxyphenyl)glycine
N-benzoyl-2-(2,4-dihydroxyphenyl)glycine
N-phenylacetyl-2-(2,4-dihydroxyphenyl)glycine
N-trifluoroacetyl-2-(2,4-dihydroxyphenyl)glycine.

EXAMPLE 13

When an equivalent amount of urea, phenylurea or benzylurea is substituted in the procedure of Example 1 for t-butyl carbamate, the following compounds are obtained, respectively:

N-carbamyl-2-(4-hydroxyphenyl)glycine
N-carbamyl-2-(2-hydroxyphenyl)glycine
N-(N-phenylcarbamyl)-2-(4-hydroxyphenyl)glycine
N-(N-phenylcarbamyl)-2-(2-hydroxyphenyl)glycine
N-(N-benzylcarbamyl)-2-(4-hydroxyphenyl)glycine
N-(N-benzylcarbamyl)-2-(2-hydroxyphenyl)glycine.

EXAMPLE 14

Substitution of an equivalent amount of urea, phenylurea or benzylurea in the procedure of Example 3 for t-butyl carbamate gives the following compounds, respectively:

N-carbamyl-2-(4-hydroxy-3-methylphenyl)glycine
N-carbamyl-2-(2-hydroxy-3-methylphenyl)glycine
N-(N-phenylcarbamyl)-2-(4-hydroxy-3-methylphenyl)-glycine
N-(N-phenylcarbamyl)-2-(2-hydroxy-3-methylphenyl)-glycine
N-(N-benzylcarbamyl)-2-(4-hydroxy-3-methylphenyl)glycine
N-(N-benzylcarbamyl)-2-(2-hydroxy-3-methylphenyl)glycine.

EXAMPLE 15

When an equivalent amount of urea, phenylurea or benzylurea is substituted in the procedure of Example 6 for t-butyl carbamate, the corresponding compounds listed below are obtained:

N-carbamyl-2-(4-hydroxy-3,5-dimethoxyphenyl)glycine
N-(N-phenylcarbamyl)-2-(4-hydroxy-3,5-dimethoxyphenyl)glycine
N-(N-benzylcarbamyl)-2-(4-hydroxy-3,5-dimethoxyphenyl)glycine.

EXAMPLE 16

Substitution of an equivalent amount of urea, phenylurea or benzylurea in the procedure of Example 7 for t-butyl carbamate gives the following compounds, respectively:

N-carbamyl-2-(2,4-dihydroxyphenyl)glycine
N-(N-phenylcarbamyl)-2-(2,4-dihydroxyphenyl)glycine
N-(N-benzylcarbamyl)-2-(2,4-dihydroxyphenyl)glycine.

EXAMPLE 17

When an equivalent amount of t-butyl thiocarbamate [J. Org. Chem. 28, 3421 (1963); U.S. Pat. No. 3,072,710], benzyl thiocarbamate [J. Amer. Chem. Soc. 82, 4582 (1960)], benzhydryl carbamate or β,β,β-trichloroethyl carbamate (U.S. Pat. No. 3,072,710) is substituted in the procedure of Example 1 for t-butyl carbamate, the following compounds are obtained, respectively:

N-t-butylthiocarbonyl-2-(4-hydroxyphenyl)glycine
N-t-butylthiocarbonyl-2-(2-hydroxyphenyl)glycine
N-benzylthiocarbonyl-2-(4-hydroxyphenyl)glycine
N-benzylthiocarbonyl-2-((2-hydroxyphenyl)glycine
N-benzhydryloxycarbonyl-2-(4-hydroxyphenyl)glycine
N-benzhydryloxycarbonyl-2-(2-hydroxyphenyl)glycine
N-(β,β,β-trichloroethoxycarbonyl)-2-(4-hydroxyphenyl)glycine
N-(β,β,β-trichloroethoxycarbonyl)-2-(2-hydroxyphenyl)glycine.

EXAMPLE 18

Substitution of an equivalent amount of t-butyl thiocarbamate, benzyl thiocarbamate, benzhydryl carbamate or β,β,β-trichloroethyl carbamate in the procedure of Example 3 for t-butyl carbamate gives the following compounds, respectively:

N-t-butylthiocarbonyl-2-(4-hydroxy-3-methylphenyl)glycine
N-t-butylthiocarbonyl-2-(2-hydroxy-3methylphenyl)glycine N-benzylthiocarbonyl-2-(4-hydroxy-3-methylphenyl)glycine
N-benzylthiocarbonyl-2-(2-hydroxy-3-methylphenyl)glycine
N-benzhydryloxycarbonyl-2-(4-hydroxy-3-methylphenyl)glycine
N-benzhydryloxycarbonyl-2-(2-hydroxy-3-methylphenyl)glycine
N-($\beta,\beta,\beta$-trichloroethoxycarbonyl)-2-(4-hydroxy-3-methylphenyl)glycine
N-($\beta,\beta,\beta$-trichloroethoxycarbonyl)-2-(2-hydroxy-3-methylphenyl)glycine.

EXAMPLE 19

When an equivalent amount of t-butyl thiocarbamate, benzyl thiocarbamate, benzhydryl carbamate or $\beta,\beta,\beta$-trichloroethyl carbamate is substituted in the procedure of Example 6 for t-butyl carbamate, the corresponding compounds listed below are obtained:
N-t-butylthiocarbonyl-2-(4-hydroxy-3,5-dimethoxyphenyl)glycine
N-benzylthiocarbonyl-2-(4-hydroxy-3,5-dimethoxyphenyl)glycine
N-benzhydryloxycarbonyl-2-(4-hydroxy-3,5-dimethoxyphenyl)glycine
N-($\beta,\beta,\beta$-trichloroethoxycarbonyl)-2-(4-hydroxy-3,5-dimethoxyphenyl)glycine.

EXAMPLE 20

Substitution of an equivalent amount of t-butyl thiocarbamate, benzyl thiocarbamate, benzhydryl carbamate or $\beta,\beta,\beta$-trichloroethyl carbamate in the procedure of Example 7 for t-butyl carbamate gives the following compounds, respectively:
N-t-butylthiocarbonyl-2-(2,4-dihydroxyphenyl)glycine
N-benzythiocarbonyl-2-(2,4-dihydroxyphenyl)glycine
N-benzhydryloxycarbonyl-2-(2,4-dihydroxyphenyl)glycine
N-($\beta,\beta,\beta$-trichloroethoxycarbonyl)-2-(2,4-dihydroxyphenyl)glycine.

EXAMPLE 21

When an equivalent amount of a hydroxybenzene listed below:

2-chlorophenol    2-nitrophenol 2-fluorophenol    catechol 3-ethylphenol     phloroglucinol 3-acetamidophenol  2-methoxyphenol is substituted in the procedure of Example 1 for phenol, in the procedure of Example 3 for o-cresol or in the procedure of Example 5 for 2,6-xylenol, the following compounds are obtained:
N-t-butoxycarbonyl-2-(3-chloro-4-hydroxyphenyl)glycine
N-t-butoxycarbonyl-2-(3-chloro-2-hydroxyphenyl)glycine
N-t-butoxycarbonyl-2-(3-fluoro-4-hydroxyphenyl)glycine
N-t-butoxycarbonyl-2-(3-fluoro-2-hydroxyphenyl)glycine
N-t-butoxycarbonyl-2-(2-ethyl-4-hydroxyphenyl)glycine
N-t-butoxycarbonyl-2-(4-ethyl-2-hydroxyphenyl)glycine
N-t-butoxycarbonyl-2-(2-acetamido-4-hydroxyphenyl)glycine
N-t-butoxycarbonyl-2-(4-acetamido-2-hydroxyphenyl)glycine
N-t-butoxycarbonyl-2-(4-hydroxy-3-nitrophenyl)glycine
N-t-butoxycarbonyl-2-(2-hydroxy-3-nitrophenyl)glycine
N-t-butoxycarbonyl-2-(3,4-dihydroxyphenyl)glycine
N-t-butoxycarbonyl-2-(2,3-dihydroxyphenyl)glycine
N-t-butoxycarbonyl-2-(2,4,6-trihydroxyphenyl)glycine
N-t-butoxycarbonyl-2-(4-hydroxy-3-methoxyphenyl)glycine
N-t-butoxycarbonyl-2-(2-hydroxy-3-methoxyphenyl)glycine In like manner, the hydroxybenzenes listed above may be substituted in the procedures of Examples 9, 13 and 17 to give the corresponding compounds of this invention.

EXAMPLE 22

When an equivalent amount of n-butyl glyoxylate (Org. Syn., Col. Vol. 4,124) is substituted in the procedure of Example 1 for glyoxylic acid hydrate, N-t-butoxycarbonyl-2-(4-hydroxyphenyl)glycine n-butyl ester and N-t-butoxycarbonyl-2-(2-hydroxyphenyl)glycine n-butyl ester are obtained.

In like manner, N-benzyloxycarbonyl-2-(4-hydroxyphenyl)glycine and N-benzyloxycarbonyl-2-(2-hydroxyphenyl)glycine n-butyl esters are obtained by substitution of an equivalent amount of n-butyl glyoxylate in the procedure of Example 2 for glyoxylic acid hydrate.

Similarly, the n-butyl esters of the other phenylglycines disclosed herein may be prepared by substitution of an equivalent amount of n-butyl glyoxylate for glyoxylic acid hydrate in the appropriate procedures.

EXAMPLE 23

Substitution of an equivalent amount of ethyl gyloxylate [Synthesis,544 (1972)] in the procedure of Example 1 for glyoxylic acid hydrate gives N-t-butoxycarbonyl-2-(4-hydroxyphenyl)glycine ethyl ester and N-t-butoxycarbonyl-2-(2-hydroxyphenyl)glycine ethyl ester.

Likewise, ethyl esters of the other phenylglycines disclosed herein may be prepared by substitution of an equivalent amount of ethyl glyoxylate for glyoxylic acid hydrate in the appropriate procedures.

EXAMPLE 24

When an equivalent amount of methyl glyoxylate [Synthesis,544 (1972)] is substituted in the procedure of Example 1 for glyoxylic acid hydrate, N-t-butoxycarbonyl-2-(4-hydroxyphenyl)glycine methyl ester and N-t-butoxycarbonyl-2-(2-hydroxyphenyl)glycine methyl ester are obtained.

Methyl esters of the other phenylglycines described above may be prepared by substitution of methyl glyoxylate for glyoxylic acid hydrate in the appropriate procedures.

We claim:
1. A process for preparing an ortho or para-hydroxy compound of the formula:

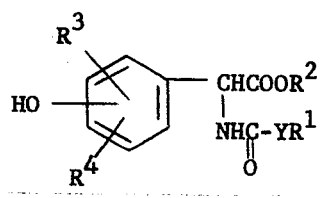

in which:

Y is O, S, NH or a carbon-carbon single bond;
$R^1$ is hydrogen, except when Y is O or S; lower alkyl of from one to five carbon atoms; trichloroethyl; trifluoromethyl, when Y is a carbon-carbon single bond; phenyl; benzyl; benzhydryl or α-phenethyl;
$R^2$ is hydrogen, lower alkyl of from one to five carbon atoms, benzyl, benzhydryl, menthyl, 2-octyl or trichloroethyl; and
$R^3$ and $R^4$ are each hydrogen, lower alkyl or lower alkoxy of from one to five carbon atoms, hydroxy, halo, acetamido or nitro,
comprising reacting a phenol of the formula

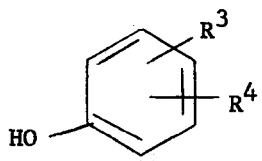

with a glyoxylic acid or ester of the formula
OHCCOOR², where R² is as defined above, and an amide, thiocarbamate, carbamate or urea of the formula

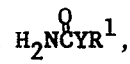

where Y and $R^1$ are as defined above.

2. A process according to claim 1 in which the process is acid-catalyzed.

3. A process according to claim 2 in which the process is catalyzed with boron trifluoride.

4. A process according to claim 1 in which $R^1$ is t-butyl, benzyl, benzhydryl or trichloroethyl and Y is O.

5. A process according to claim 4 in which $R^2$ is hydrogen.

6. A process according to claim 5 in which $R^3$ and $R^4$ are each hydrogen, methyl, methoxy, hydroxy, or fluoro.

7. A process according to claim 6 in which the reaction is carried out at room temperature.

8. A process according to claim 7 in which the reactants are glyoxlyic acid, t-butyl carbamate and phenol.

* * * * *